United States Patent [19]
Hiraiwa et al.

[11] Patent Number: 5,783,294
[45] Date of Patent: Jul. 21, 1998

[54] ELECTROCONDUCTIVE COMPOSITE PLASTIC RESIN SHEET

[75] Inventors: Shigenobu Hiraiwa; Kiyofumi Tanaka; Hiroshi Kato, all of Omiya, Japan

[73] Assignee: Shin-Etsu Polymer Co. Ltd., Tokyo, Japan

[21] Appl. No.: 772,921

[22] Filed: Dec. 24, 1996

[30] Foreign Application Priority Data

Dec. 28, 1995 [JP] Japan ................................ 7-343316

[51] Int. Cl.$^6$ ................................ B32B 7/02; H01B 1/00
[52] U.S. Cl. .................... 428/215; 428/323; 428/334; 428/335; 428/337; 428/424.2; 428/424.4; 428/424.7; 428/424.8
[58] Field of Search ..................... 252/510, 511; 428/213, 215, 323, 334, 335, 337, 408, 424.2, 424.7, 424.8, 424.4

[56] References Cited

U.S. PATENT DOCUMENTS 5,346,736  9/1994  Mizuno et al. ..................... 428/36.9

*Primary Examiner*—D. S. Nakarani
*Attorney, Agent, or Firm*—David E. Dougherty

[57] ABSTRACT

Proposed is a novel electroconductive composite plastic resin sheet consisting of an insulating base sheet of a plastic resin and an electroconductive coating layer formed on at least one of the surfaces of the base sheet, which is suitable as a material of a carrier tape used in transportation, storage and mounting works of chip-formed electronic devices such as ICs. The electroconductive composite plastic resin sheet of the invention characteristically consists of:

(A) a base sheet having a thickness in the range from 100 to 1000 μm formed from an electrically insulating polystyrene-based plastic resin; and (B) a coating layer having a thickness in the range from 0.1 to 30 μm formed on at least one surface of the base sheet from an electroconductive coating composition comprising:

(a) 100 parts by weight of an acrylic urethane-based resin as the vehicle of the coating composition to form the matrix phase of the coating layer; and (b) from 15 to 35 parts by weight of electroconductive particles having an average particle diameter in the range from 0.05 to 1.0 μm uniformly dispersed in the vehicle resin, the surface of the coating layer having a surface resistivity in the range from $10^4$ to $10^8$ ohm at 23° C.

4 Claims, No Drawings

ELECTROCONDUCTIVE COMPOSITE PLASTIC RESIN SHEET

BACKGROUND OF THE INVENTION

The present invention relates to an electroconductive composite plastic resin sheet and an embossed carrier tape made therefrom. More particularly, the invention relates to an electroconductive composite plastic resin sheet consisting of a base sheet of an insulating plastic resin and an electroconductive coating layer formed on at least one of the surfaces thereof as well as a carrier tape, top tape, tray, cover, spacer for TAB tapes and the like shaped from the composite sheet for use in transportation, storage and assembling works of various kinds of fine electronic devices such as ICs, transistors, diodes and the like.

Needless to say, plastic resin sheets in general are widely used in a great variety of applications by virtue of their excellent properties such as high impact strength, good moldability, lightness in weight and so on. Plastic resin sheets, on the other hand, are generally highly insulating to be susceptible to accumulation of electrostatic charges so that one of serious disadvantages or problems in plastic resin sheets is attraction of dust particles thereto due to charging with static electricity. When a plastic resin sheet is used as a wrapping material of electronic devices, for example, various adverse influences are caused in the performance of the devices due to the static electricity on the wrapping material per se or due to the dust particles deposited on the electrostatically charged wrapping material.

Along with the rapid progress of the assembling technologies in the fields of electronic in recent years, demand is increasing year by year for high-performance compact electronic devices, in particular, of the chip type such as ICs, transistors, diodes and the like. In the transportation, storage and assembling works of these fine electronic devices, it is usual for convenience of handling and protection that the devices are carried or encased in a so-called embossed carrier tape or tray which is shaped from a plastic resin sheet by vacuum forming, pressure forming, compression molding or other suitable secondary molding methods. Taking an embossed carrier tape as an example, a carrier tape holding the electronic devices encased in the embossed cavities is covered with a top tape also made from a plastic resin sheet and the margins of the carrier tape and top tape are air-tightly sealed to give a continuous-length wrap body as a supply form of the electronic devices to the users. When the electronic devices are mounted on electronic circuit boards in the assemblage works, the continuous-length wrap body is introduced from one end into an automatic assembling machine in which the top tape is removed from the wrap body by peeling from the carrier tape and the chip-formed devices are picked up from the cavities of the carrier tape one by one to be mounted on the circuit board at the respective proper positions.

It is almost unavoidable in the above described process of using a carrier tape that electrostatic charges are generated by rubbing of the surface of the plastic resin sheets or by peeling of the top tape from the carrier tape sometimes to cause a difficulty in exact and accurate positioning of the devices in mounting of the same on the proper positions of a circuit board with eventual electrostatic breakdown. As is readily understood, the above mentioned troubles due to accumulation of static electricity can be prevented or reduced when the plastic resin sheet forming the carrier tape and top tape or, in particular, the surface thereof is rendered electroconductive or imparted with a decreased electric surface resistivity.

In this regard, various types of plastic resin sheets imparted with electroconductivity have been proposed and tested heretofore as a material of embossed carrier tapes including an integrally laminated three-layered sheet consisting of a base sheet made from an insulating polystyrene-based plastic resin and coextrusion-molded electroconductive layers on both of the surfaces of the base sheet made from an electroconductive polystyrene-based resin composition comprising a polystyrene-based resin as the matrix phase and a large amount of electroconductive particles such as carbon blacks dispersed in the matrix phase.

While it is very important that an embossed carrier tape has very accurate dimensions because otherwise serious machine troubles are encountered in the automatic assembling works of chip-formed electronic devices as a result of non-uniformity in the feeding pitch of the wrap body so that the plastic resin sheet as the material of the carrier tape is also required to have high dimensional stability and very small fabrication errors in dimensions. In this regard, the above described three-layered laminated sheet is not quite satisfactory due to the poor molding workability and low dimensional accuracy in shaping and embossing along with low mechanical strengths if not to mention the relatively high costs for the preparation of such a laminated sheet. In addition, troubles are sometimes encountered as a consequence of the large amount of electroconductive particles dispersed in the matrix phase of an insulating plastic resin that, when the wall of the carrier tape is rubbed with the electronic devices encased therein by vibration or shock unavoidable in the transportation of the wrap bodies, the electroconductive particles fall from the walls to deposit on the electrode terminals of the devices resulting in insulation failure. This problem is deemed to be more and more serious in the near future in order to comply with the technological trend toward a higher and higher assemblage density of devices, finer and finer lead wires and finer and finer pitches in the arrangement of the terminals. Situations are similar also in the trays of electronic devices made from a plastic resin sheet.

Turning now to the top tapes as a covering on the carrier tape holding electronic devices encased therein, it is usual that the top tape is adhesively bonded to the carrier tape by using a polystyrene-based hot-melt adhesive which, however, is not highly reliable as an adhesive onto the surface of the above mentioned three-layered laminated resin sheet in the prior art because the adhesive bonding strength heavily depends on the temperature at which the hot-melt adhesive is brought into service or the adhesive is subject to denaturation in the lapse of time so as to cause an adhesion failure during transportation and storage of the wrap bodies.

SUMMARY OF THE INVENTION

The present invention, completed as a result of the extensive investigations in consideration of the above described problems, accordingly has a primary object to provide a novel and improved plastic resin sheet having good electroconductivity on the surface along with good molding workability and dimensional stability in shaping and embossing so as to be suitable as a material of a carrier tape which is free from the troubles due to falling of the electroconductive particles from the electroconductive layer and capable of exhibiting good adhesive bonding to the top tape with good sealability.

Thus, the electroconductive composite plastic resin sheet, which is suitable as a material of carrier tapes, provided by the invention is a composite sheet which consists essentially of:

(A) a base sheet having a thickness in the range from 100 to 1000 μm formed from an electrically insulating polystyrene-based plastic resin; and (B) a coating layer having a thickness in the range from 0.1 to 30 μm formed on at least one surface of the base sheet from an electroconductive coating composition comprising:

(a) 100 parts by weight of an acrylic urethane-based resin as the vehicle of the coating composition to form the matrix phase of the coating layer; and (b) from 15 to 35 parts by weight of electroconductive particles having an average particle diameter in the range from 0.05 to 1.0 μm uniformly dispersed in the vehicle resin, the surface of the coating layer having a surface resistivity in the range from $10^4$ to $10^8$ ohm at 23° C.

DETAILED DESCRIPTION OF THE PREFERRED EMBODIMENTS

As is described above, the electroconductive composite plastic resin sheet of the invention is an integral composite sheet consisting of an insulating base sheet and an electroconductive coating layer thereon formed on at least one of the base sheet from a very specific coating composition comprising a specific resin and a specific amount of specific electroconductive particles.

The specific resin forming the matrix phase of the coating layer is an acrylic urethane-based resin which can be a polymer alloy, a copolymer or a blend thereof. It is preferable that the weight fraction of the acrylic moiety in the resin is in the range from 10 to 90%, the balance being the urethane moiety, in respect of the excellent adhesive bonding behavior when an embossed carrier tape formed from the composite sheet is adhesively bonded to a top tape. On the other hand, the powder of the electroconductive particles dispersed in the matrix resin is preferably a powder of electroconductive carbon because the composite resin sheet having a carbon-loaded coating layer is susceptible to shaping into a shaped body with a large drawing ratio without suffering a large increase in the surface resistivity to give stable electroconductivity.

The insulating base sheet forming the inventive electroconductive plastic resin sheet is made from a polystyrene-based resin which can be selected from a variety of resins without particular limitations. Namely, the polystyrene-based resin is exemplified by the homopolymers of a styrene monomer such as styrene, α-methylstyrene, 4-tert-butyl styrene, 4-methyl styrene and the like, copolymers of two kinds or more of these styrene monomers, copolymers of one or more of the styrene monomers and one or more of other monomers copolymerizable with the styrene monomers such as (meth)acrylonitrile, butadiene, butyl (meth) acrylate, methyl (meth)acrylate, ethyl (meth)acrylate, (meth)acrylic acid, maleic anhydride and the like. Among these polystyrene-based plastic resins, in particular, so-called ABS resins as a ternary copolymer of acrylonitrile, butadiene and styrene are preferred in respect of the high impact strength of the electroconductive composite plastic resin sheet of the invention when the carrier tapes and trays are to be used under a climatic condition of extremely low temperatures in view of the low-temperature impact strength of ABS resins in general.

It is of course optional that the base sheet of the inventive electroconductive plastic resin sheet is formed from a blend of two kinds or more of the polystyrene-based resins instead of a single kind of the resins according to need. Although trays and spacers for TAB tapes can be prepared from any polystyrene-based resins without particular limitations for the base sheet of the composite sheet, it is preferable that embossed carrier tapes are prepared from a composite sheet of which the base sheet is formed from a polystyrene-based resin containing a substantial amount of the acrylonitrile moiety or methyl methacrylate moiety in consideration of the bonding strength to a top tape and impact strength as well as good bonding susceptibility thereof to the electroconductive coating layer formed thereon.

The base sheet of a polystyrene-based resin as a constituent of the inventive electroconductive composite plastic resin sheet should have a thickness in the range from 100 to 1000 μm or, preferably, from 200 to 600 μm.

The electroconductive composite plastic resin sheet of the invention can be obtained by providing at least one of the surfaces of the base sheet with an electroconductive coating layer by using a specific electroconductive coating composition, of which the vehicle resin is an acrylic urethane-based resin. Examples of suitable acrylic urethane-based resins include copolymers of an acrylic monomer such as methyl (meth)acrylate, ethyl (meth)acrylate, isobutyl (meth)acrylate, n-hexyl (meth)acrylate, (meth)acrylamide and the like with a polyether urethane compound, polyester urethane compound, polycarbonate urethane compound, epoxy-modified urethane compound and the like and plastic alloys consisting of an acrylic resin obtained from the above named acrylic monomers and a urethane resin obtained from the above named urethane compounds as well as blends of such a plastic alloy with the above mentioned copolymers.

Preferably, the weight fraction of the acrylic moiety in the above mentioned acrylic urethane-based resin should be in the range from 10 to 90%, the balance being the urethane moiety, in view of the adhesion to the base sheet of a polystyrene-based resin, moldability and scratch resistance. The adhesion of the coating layer to the base sheet is particularly important when the electroconductive plastic resin sheet is used as a material of embossed carrier tapes in order that the bonding strength therebetween is high enough to withstand the peeling force for the removal of the top tape from the carrier tape to which the top tape is adhesively bonded for air-tight sealing. When the weight fraction of the acrylic moiety is too small, the electroconductive coating layer would be subject to falling due to failure of adhesion in the removal of the top tape by peeling from the carrier tape while, when the weight fraction of the acrylic moiety is too large, a decrease is caused in the adhesive bonding strength of the top tape to the carrier tape.

The material of the electroconductive particles to be dispersed in the above described acrylic urethane-based resin to form the matrix phase of the electroconductive coating layer is exemplified by electroconductive carbons, tin oxide, indium oxide, antimony oxide and the like which can be used either singly or as a combination of two kinds or more according to need although electroconductive carbons are preferred when several factors are taken into consideration such as the adhesion of the coating layer to the base sheet, moldability of the composite sheet and surface resistivity of the coating layer. Electroconductive carbon is available as various grades of carbon black products including oil furnace blacks, gas furnace blacks, channel blacks, lamp blacks, thermal blacks, acetylene blacks and the like, of which oil furnace blacks sold under the trade name of, for example, Ketjen Black are preferred in respect of the high electroconductivity obtained with a relatively low loading amount of the carbon particles in the vehicle resin.

The electroconductive particles as the dispersed phase in the electroconductive coating composition should have an average particle diameter in the range from 0.05 to 1.0 µm although the average particle diameter can be somewhat finer than 0.05 µm, for example, to be down to 0.01 µm. When the electroconductive particles are too fine, difficulties are encountered in the preparation of the electroconductive coating composition in the form of a flowable uniform composition due to the poor dispersibility of such fine particles while, when the particles are too coarse, a decrease is caused in the smoothness of the surface of the coating layer so that the airtight sealing of a carrier tape prepared from such a composite sheet to a top tape cannot be reliable in addition to eventual falling of the electroconductive particles off the surface of the coating layer by rubbing.

The amount of the electroconductive particles in the electroconductive coating composition is in the range from 15 to 35 parts by weight per 100 parts by weight of the acrylic urethane-based rein as the vehicle of the coating composition. When the amount of the electroconductive particles is too small, no sufficiently high electroconductivity as desired can be obtained as a matter of course while, when the amount of the particles is too large, the electroconductive particles may eventually fall from the electroconductive coating layer by rubbing along with a decrease in the moldability to cause a difficulty in the preparation of a carrier tape from the composite sheet by the method of vacuum forming, pressure forming, compression molding or other secondary molding processes.

It is essential that the electroconductive coating layer formed from the electroconductive coating composition has a surface resistivity in the range from $10^4$ to $10^8$ ohm at 23° C. When the surface resistivity of the coating layer is too low, troubles are caused in the electronic devices held on the carrier tape due to eventual short-circuiting between the electrode terminals in contact with the electroconductive coating layer while, when the surface resistivity is too high, accumulation of static electricity on the surface of the coating layer can hardly be prevented not to meet the object of the present invention.

The electroconductive coating layer on at least one surface of the base sheet can be formed in any known methods conventional in the art of coating. For example, the vehicle resin and the electroconductive particles are dissolved or dispersed in an organic solvent in a specified weight proportion to form a liquid coating composition which is uniformly applied to the surface of the base sheet followed by drying to give a dried coating layer.

The organic solvent used in the preparation of the coating composition is exemplified by aromatic hydrocarbon solvents such as toluene, xylene and the like, ketone solvents such as acetone, methyl ethyl ketone, methyl isobutyl ketone and the like, ester solvents such as ethyl acetate, butyl acetate and the like, alcoholic solvents such as methyl alcohol, ethyl alcohol, isopropyl alcohol, sec-butyl alcohol and the like, and so on, of which alcoholic solvents are preferred because the base sheet of a polystyrene-based resin is safe from the attack of the organic solvent and the electroconductive coating layer after drying is highly uniform without any cracks or fissures along with the stability and reproducibility in the surface resistivity of the coating layer. It is of course optional to use a single kind or a combination of two kinds or more of the above named various organic solvents.

The method for coating of the base sheet with the above described coating composition is not particularly limitative and can be conventional including the methods of reverse coating, direct gravure coating, gravure offset coating, wire-bar coating and the like. In particular, the reverse coating method is preferred by using a three-roller reverse roll coater in respect of the high uniformity of the coating layer to have a reliable electroconductivity of the conductive coating layer even with a relatively small coating amount not to adversely affect the moldability of the electroconductive composite resin sheet of the invention.

The electroconductive coating layer should have a thickness in the range from 0.1 to 30 µm as dried in view of the workability in coating. When the thickness of the coating layer is too small, the carrier tape and other articles shaped by secondary working from the composite resin sheet may suffer an increase in the surface resistivity while, when the thickness is too large, a decrease is caused in the moldability of the electroconductive composite resin sheet.

It is of course optional according to need that the above described electroconductive coating composition is admixed with, besides the above described vehicle resin and electroconductive particles, various kinds of known additives such as surface active agents, plasticizers, coalescing agents, leveling agents, moisturizing agents, antifoam agents, antiseptic agents, ultraviolet absorbers, dyes, pigments, antioxidants, inorganic bodying pigments and others each in a limited amount not to adversely affect the workability in secondary molding, blocking behavior and electroconductivity of the composite resin sheet.

Besides the above described electroconductive composite resin sheet, the invention, in the second aspect, provides a novel and improved embossed carrier tape for electronic devices, which is shaped from the above described electroconductive composite resin sheet. The method for shaping the composite resin sheet into an embossed carrier tape is not particularly limitative and can be conventional including the methods of vacuum forming, pressure forming, compression molding and so on. The carrier tape of the invention has good electroconductivity on the surface and excellent dimensional accuracy in shaping and embossing as well as excellent mechanical properties along with good adhesive bonding behavior to a top tape so that the carrier tape is free from separation of the electroconductive coating layer from the base sheet in the course of removal of the top tape by peeling and also free from eventual falling of the electroconductive particles from the electroconductive coating layer.

In the following, the electroconductive composite plastic resin sheet and the embossed carrier tape according to the invention are illustrated in more detail by way of Examples and Comparative Examples, which, however, never limit the scope of the invention in any way. In the following Examples and Comparative Examples, the electroconductive composite plastic resin sheets and the carrier tapes were evaluated by the following testing methods.

(1) Surface resistivity of sheet and carrier tape:

The surface resistivity was determined on the electroconductive coating layer of the composite resin sheet and the electroconductive coating layer at the bottom of the carrier tape in an atmosphere of 15% relative humidity at 23° C. by using a surface resistivity tester with comparator (Model MCP-TESTER, manufactured by Mitsubishi Chemical Co.) according to the procedure specified in EIA-541.

(2) Dimensional accuracy in shaping:

Visual inspection was conducted for the thickness of the bottom wall of the carrier tape and uniformity of the feeding pitches of the carrier tape to record the results in three rating of A (good), B (fair) and C (poor).

(3) Falling of electroconductive particles from the coating layer:

The surface of the electroconductive coating layer was forcibly rubbed with a finger nail and a visual inspection was undertaken for falling of the electroconductive particles to record the results in two rating of A for absence of falling and B for occurrence of falling.

(4) Sealability of carrier tape to top tape:

The carrier tape and a top tape (SP-82, a product by Shin-Etsu Polymer Co.) were bonded together to effect sealing by using a sealing machine (Model Vanguard VN3200, manufactured by Vanguard Systems Co.) under the conditions of 2 seconds at 140° C. followed by a peeling test by using a peeling tester (Model Vanguard VG-10, manufactured by Vanguard Systems Co.) under the conditions of a peeling velocity of 300 mm/minute in the 180° direction according to the procedure specified in EIA-481, 1.2.3, to record the results in three ratings of A for separation between the carrier tape and top tape, B for partial separation of the electroconductive coating layer from the base sheet and C for complete separation of the electroconductive coating layer from the base sheet.

(5) Crack formation at 10° C.:

The carrier tape was kept standing for 24 hours in a thermostat controlled at 10° C. and taken out therefrom immediately followed by an impact test in which a steel ball of 50 g weight was dropped from just above the carrier tape at a height of 10 cm to visually inspect occurrence of cracks. The results were recorded in two ratings of A for absence of cracks and B for occurrence of cracks.

(6) Bonding strength of electroconductive coating layer:

Measurements were performed according to the procedure specified in JIS K5400 to record the results in three ratings of A for an index value of 8 to 10 (good), B for an index value of 5 to 7 (fair) and C for an index value of 0 to 4 (poor).

Five grades of polystyrene-based resin sheets, referred to as PS-1 to PS-5 hereinafter, and four grades of electroconductive particles, referred to as F-1 to F-4 hereinafter, were used in the preparation of the electroconductive composite plastic resin sheets. They are characterized as follows.

(Polystyrene-based resin sheets)

PS-1: 300 μm thick transparent sheet of a general-purpose polystyrene resin containing no acrylic ingredient (Clearene, a product by Denki Kagaku Kogyo Co.)

PS-2: 300 μm thick transparent sheet of a polystyrene resin containing an acrylic ingredient (SD-220, a product by Asahi Chemical Co.)

PS-3: 300 μm thick sheet of an acrylonitrile-butadiene-styrene copolymeric resin (No. 0195, a product by Shin-Etsu Polymer Co.)

PS-4: 300 μm thick sheet of an ABS resin containing an acrylic ingredient (XT Polymer Sheet, a product by Daicel Chemical Co.)

PS-5: three-layered composite sheet with a core layer of a polystyrene-based resin sandwiched by layers of electroconductive carbon each having a thickness of 30 μm by the method of coextrusion with a total thickness of 300 μm (Electroconductive particles)

F-1: Ketjen Black (supra) having an average particle diameter of 0.5 μm

F-2: tin oxide particles having an average particle diameter of 0.5 μm

F-3: Ketjen Black (supra) having an average particle diameter of 0.02 μm

F-4: Ketjen Black (supra) having an average particle diameter of 2 μm In the following description, the term of "parts" always refers to "parts by weight".

EXAMPLE 1

A coating composition was prepared by dissolving, in a 1:1 by volume mixture of toluene and isopropyl alcohol, 100 parts of a first acrylic urethane-based resin, of which the weight fractions of the urethane moiety and acrylic moiety were 90% and 10%, respectively, and 15 parts of the electroconductive particles F-1 in such amounts that the content of the non-volatile matter in the composition was 10% by weight.

The polystyrene-based resin sheet PS-2 was coated on both flat surfaces with the above prepared coating composition by the direct gravure coating method in a coating amount of about 10 g/m$^2$ before drying per surface followed by drying at 80° C. for 1 minute to form a composite resin sheet having electroconductive coating layers of each about 1 μm thickness.

The above obtained composite resin sheet was shaped by compression molding into a carrier tape having cavities for holding chip-formed devices each having dimensions of 5 mm by 5 mm in the longitudinal and transverse directions and 5 mm in the depth. The carrier tape was subjected to the evaluation tests in the procedures described above to give the results shown in Table 1 to follow, which also shows the data obtained with the resin sheet PS-5 as such for the purpose of control.

EXAMPLE 2

The procedures for the preparation of a composite resin sheet and an embossed carrier tape were substantially the same as in Example 1 excepting for an increase in the amount of the electroconductive particles F-1 from 15 parts to 35 parts and replacement of the polystyrene-based resin sheet PS-2 with PS-1. The results obtained in the evaluation tests of the composite resin sheet and carrier tape are shown in Table 1.

EXAMPLE 3

The procedures for the preparation of a composite resin sheet and an embossed carrier tape were substantially the same as in Example 1 except that the acrylic urethane-based resin was replaced with the same amount of a second acrylic urethane-based resin, of which the weight fractions of the urethane moiety and acrylic moiety were 10% and 90%, respectively, and the polystyrene-based resin sheet PS-2 was replaced with PS-3. The results obtained in the evaluation tests of the composite resin sheet and carrier tape are shown in Table 1.

EXAMPLE 4

The procedures for the preparation of a composite resin sheet and an embossed carrier tape were substantially the same as in Example 1 except that the electroconductive particles F-1 were replaced with the same amount of F-2 and the polystyrene-based resin sheet PS-2 was replaced with PS-4. The results obtained in the evaluation tests of the composite resin sheet and carrier tape are shown in Table 1.

EXAMPLE 5

The procedures for the preparation of a composite resin sheet and an embossed carrier tape were substantially the same as in Example 1 except that the acrylic urethane-based resin was replaced with the same amount of a third acrylic urethane-based resin, of which the weight fractions of the urethane moiety and acrylic moiety were 95% and 5%, respectively. The results obtained in the evaluation tests of the composite resin sheet and carrier tape are shown in Table 1.

EXAMPLE 6

The procedures for the preparation of a composite resin sheet and an embossed carrier tape were substantially the same as in Example 1 except that the acrylic urethane-based resin was replaced with the same amount of a fourth acrylic urethane-based resin, of which the weight fractions of the urethane moiety and acrylic moiety were 5% and 95%, respectively. The results obtained in the evaluation tests of the composite resin sheet and carrier tape are shown in Table 1.

COMPARATIVE EXAMPLE 1

The procedures for the preparation of a composite resin sheet and an embossed carrier tape were substantially the same as in Example 1 excepting for a decrease in the amount of the electroconductive particles F-1 from 15 parts to 10 parts. The results obtained in the evaluation tests of the composite resin sheet and carrier tape are shown in Table 1.

COMPARATIVE EXAMPLE 2

The procedures for the preparation of a composite resin sheet and an embossed carrier tape were substantially the same as in Example 1 excepting for an increase in the amount of the electroconductive particles F-1 from 15 parts to 50 parts. The results obtained in the evaluation tests of the composite resin sheet and carrier tape are shown in Table 1.

COMPARATIVE EXAMPLE 3

The procedures for the preparation of a composite resin sheet and an embossed carrier tape were substantially the same as in Example 1 except that the electroconductive particles F-1 were replaced with the same amount of F-3 and the polystyrene-based resin sheet PS-2 was replaced with PS-3. The results obtained in the evaluation tests of the composite resin sheet and carrier tape are shown in Table 1.

COMPARATIVE EXAMPLE 4

The procedures for the preparation of a composite resin sheet and a carrier tape were substantially the same as in Example 1 except that the electroconductive particles F-1 were replaced with the same amount of F-4 and the polystyrene-based resin sheet PS-2 was replaced with PS-3. The results obtained in the evaluation tests of the composite resin sheet and carrier tape are shown in Table 1.

COMPARATIVE EXAMPLE 5

The procedures for the preparation of a composite resin sheet and an embossed carrier tape were substantially the same as in Example 1 except that the acrylic urethane-based resin was replaced with the same amount of a fifth resin which was a urethane resin containing no acrylic constituent. The results obtained in the evaluation tests of the composite resin sheet and carrier tape are shown in Table 1.

COMPARATIVE EXAMPLE 6

The procedures for the preparation of a composite resin sheet and an embossed carrier tape were substantially the same as in Example 1 except that the acrylic urethane-based resin was replaced with the same amount of a sixth resin which was an acrylic resin containing no urethane constituent. The results obtained in the evaluation tests of the composite resin sheet and carrier tape are shown in Table 1.

TABLE 1

Item
(1): Surface resistivity of composite sheet, ohm
(2): Surface resistivity of carrier tape, ohm
(3): Dimensional accuracy in shaping
(4): Falling of electroconductive particles
(5): Sealability of carrier tape to top tape
(6): Crack formation at 10° C.
(7): Bonding strength of electroconductive layer

| Item No. | (1) | (2) | (3) | (4) | (5) | (6) | (7) |
|---|---|---|---|---|---|---|---|
| Example |  |  |  |  |  |  |  |
| 1 | $5 \times 10^5$ | $5 \times 10^6$ | A | A | A | B | A |
| 2 | $1 \times 10^5$ | $1 \times 10^6$ | A | A | A | B | A |
| 3 | $5 \times 10^5$ | $5 \times 10^6$ | A | A | A | A | A |
| 4 | $1 \times 10^6$ | $1 \times 10^7$ | A | A | A | A-B | A |
| 5 | $5 \times 10^5$ | $5 \times 10^6$ | A | A | B | B | A |
| 6 | $5 \times 10^5$ | $5 \times 10^6$ | A | A | B | A | A |
| Comparative Example |  |  |  |  |  |  |  |
| 1 | $1 \times 10^6$ | $1 \times 10^8$ | A | A | A | B | A |
| 2 | $1 \times 10^4$ | $1 \times 10^5$ | A | B | A-B | B | A-B |
| 3 | $1 \times 10^6$ | $5 \times 10^{10}$ | A | A | A | A | A |
| 4 | $5 \times 10^5$ | $5 \times 10^6$ | A | B | B | A | A-B |
| 5 | $5 \times 10^5$ | $5 \times 10^6$ | A | A | C | B | B-C |
| 6 | $5 \times 10^5$ | $5 \times 10^6$ | A | B | C | B | A |
| Control | $1 \times 10^4$ | $5 \times 10^6$ | B | B | C | B | — |

As is understood by making comparison between Examples 1 and 2 and Comparative Examples 1 and 2, the surface resistivity of the composite sheet was too large in Comparative Example 1 with a decreased amount of the electroconductive particles compounded in the coating composition while falling of the electroconductive particles took place in Comparative Example 2 with a too large amount of the electroconductive particles in the coating composition along with somewhat poor sealability of the carrier tape to the top tape and somewhat poor bonding strength of the electroconductive layer to the base sheet as compared with Examples 1 and 2.

Comparison of Example 1 with Comparative Examples 3 and 4 leads to a conclusion that the surface resistivity of the composite sheet or, in particular, carrier tape was unduly increased in Comparative Example 3 presumably as a consequence of use of electroconductive particles having an unduly fine average particle diameter while falling of the electroconductive particles took place in Comparative Example 4 with electroconductive particles of a too large average particle diameter along with somewhat poor sealability of the carrier tape to the top tape and somewhat poor bonding strength of the electroconductive layer to the base sheet as compared with Example 1.

As is understood from further comparison of the Examples and Comparative Examples 5 and 6, use of an acrylic urethane-based resin of specific weight fractions of the acrylic and urethane moieties as the vehicle in the coating composition is essential because the sealability of the carrier tape to the top tape and bonding strength of the electroconductive coating layer to the base sheet were poor in Comparative Example 5 in which the resin was a urethane resin containing no acrylic constituent while falling of the electroconductive particles took place in Comparative Example 6 in which the resin was an acrylic resin containing no urethane constituent along with a decrease in the sealability of the carrier tape to the top tape. In these regards, the commercially available electroconductive resin sheet PS-5 tested for the purpose of control was clearly inferior to those of the invention exhibiting remarkable falling of the electroconductive particles and poor sealability of the carrier tape to the top tape.

A still further comparison of Examples 1 and 4 leads to a conclusion that the Ketjen Black, F-1, is preferable as the electroconductive particles in respect of the better electroconductivity to F-4 which is a powder of tin oxide. Further, comparison of Examples 1 to 4 with Examples 5 and 6 indicates that the vehicle resin in the electroconductive coating composition is preferably an acrylic urethane-based resin of which the weight fraction of the acrylic moiety is in the range from 10 to 90%.

The data for Example 3 indicates that an ABS resin sheet is preferable as the base sheet to give quite satisfactory results in all of the evaluation items.

What is claimed is:

1. An electronductive flexible composite plastic resin sheet which consists essentially of:

(A) a base sheet having a thickness in the range from 100 to 1000 μm formed from an electrically insulating polystyrene-based plastic resin selected from the group consisting of homopolymers of styrene, α-methylstyrene, 4-tert-butyl styrene, or 4-methyl styrene; copolymers of styrene monomers and (meth) acrylonitrile, butadiene, butyl (meth) acrylate, methyl (meth) acrylate, ethyl (meth) acrylate, (meth) acrylic acid, or maleic anhydride; and a ternary copolymer of acrylonitrile, butadiene and styrene; and (B) a coating layer having a surface resistivity in the range form $10^4$ to $10^8$ ohm at 23° C. and a thickness in the range from 0.1 to 30 μm formed on at least one surface of the base sheet from an electroconductive coating composition comprising:

(a) 100 parts by weight of an acrylic urethane-based resin selected from the group consisting of copolymers of an acrylic monomer with a polyether urethane compound, polyester urethane compound, polycarbonate urethane compound or epoxy-modified urethane compound and plastic alloys consisting of an acrylic resin and a urethane resin as the vehicle of the coating composition to form the matrix phase of the coating layer; and (b) from 15 to 35 parts by weight of electroconductive particles having an average particle diameter in the range from 0.05 to 1.0 μm uniformly dispersed in the acrylic urethane based resin.

2. The electroconductive composite plastic resin sheet as claimed in claim 1 in which the weight fraction of the acrylic moiety in the acrylic urethane-based resin is in the range from 10% to 90%, the balance being urethane moiety.

3. The electroconductive composite plastic resin sheet as claimed in claim 1 in which the electroconductive particles are particles of electroconductive carbon.

4. The electroconductive composite plastic resin sheet as claimed in claim 1 in which the polystyrene-based plastic resin is a ternary copolymer of acrylonitrile, butadiene, and styrene.

* * * * *